United States Patent Office 3,402,185
Patented Sept. 17, 1968

3,402,185
1 - AMINO - 4 - METHYLAMINO - 2 - ANTHRAQUI-
NONECARBOXYLIC ACID CYCLOHEXYL-METH-
YL (OR ETHYL) -AMINOPROPYLAMIDE
Karl Maier and Julius Eisele, Ludwigshafen (Rhine), and
Wilhelm Federkiel, Frankenthal, Pfalz, Germany, as-
signors to Badische Anilin- & Soda-Fabrik Aktiengesell-
schaft, Ludwigshafen (Rhine), Germany
No Drawing. Filed June 2, 1965, Ser. No. 460,860
Claims priority, application Germany, June 18, 1964,
B 77,288
3 Claims. (Cl. 260—377)

ABSTRACT OF THE DISCLOSURE

An anthraquinone carboxamide containing in the car-
bamoyl group the γ-cyclohexylmethylaminopropyl sub-
stituent or the γ-cyclohexylethylaminopropyl substituent.
These anthraquinones are useful as dyes for dyeing poly-
acrylonitrile textile materials.

---

This invention relates to new anthraquinone dyes which
are outstandingly suitable for dyeing textile materials of
polyacrylonitrile in pure blue shades.

Aminoanthraquinone carboxamides which contain in
the carbamoyl group at least one tertiary amino group
are known from British patent specification No. 824,530.
Outstandingly fast colorations on polyacrylonitrile fibers,
particularly of excellent fastness to decatizing, are
obtained with these dyes.

As compared with basic azo and methine dyes mainly
used for dyeing polyacrylonitrile, the anthraquinone dyes
produce, however, a considerably lower color strength.
On the other hand, basic azo and methine dyes as a rule
yield colorations of low to medium fastness to decatizing
and in most cases this cannot be improved.

There is therefore the need for the provision of anthra-
quinone dyes which will exhibit not only general fastness
and particularly very good fastness to decatizing, but also
a considerably improved color strength on polyacrylo-
nitrile.

This object is achieved with dyes according to this
invention having the general formula:

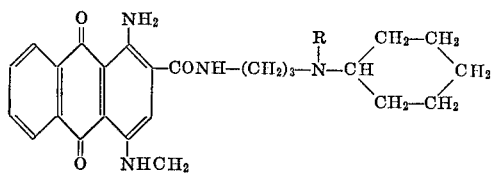

in which R denotes a methyl group or an ethyl group.

The new dyes are obtained by reacting with methyl-
amine a compound having the general formula:

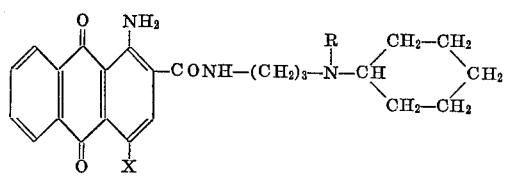

in which R has the meaning given above and X denotes
a halogen atom, particularly a bromine atom, or prefer-
ably a nitro group.

The initial compounds having the Formula II may be
obtained, for example, by reacting an acid chloride having
the formula:

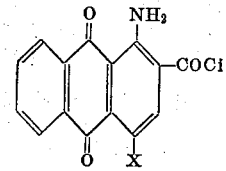

in which X has the above meaning, or an isotoic anhy-
dride having the formula:

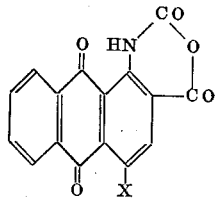

in which X has the above meaning, with an amine having
the formula:

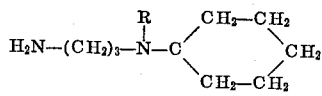

in which R has the meaning given above, advantageously
in the presence of an acid-binding agent.

Exchange of the group X for a methylamine radical is
advantageously carried out in the absence of water, if
desired with an addition of solvents which are inert under
the reaction conditions.

To exchange a nitro group in 4-position of the com-
pound having the Formula II by means of liquid anhy-
drous methylamine, it is expedient to work in a closed
vessel at temperatures of from 50° to 100° C., advan-
tageously at 60° to 70° C. As a rule the reaction is then
over in about two to six hours. The excess of methylamine
is removed and the reaction product is isolated by conven-
tional methods. The compounds having Formula I are
obtained in very good yields and very pure.

If a halogen atom, preferably a bromine atom, is ex-
changed, it is again preferable to allow liquid methyl-
amine to act at the temperatures above specified if de-
sired with the addition of copper salts, copper oxides or
metallic copper and in the presence of an inert solvent.

The new compounds having the Formula I are dyes
which are outstandingly suitable for dyeing textile mate-
rial of polyacrylonitrile or of copolymers of acrylonitrile
with other vinyl compounds, and give pure blue colora-
tions which have not only very good general fastness
properties, particularly excellent fastness to decatizing,
but also considerably better color strength than compar-
able prior art dyes.

The dyeing of polyacrylonitrile textile materials or tex-
tile materials of copolymers of acrylonitrile with other
vinyl compounds, such as vinyl chloride, vinylidene chlo-
ride, vinyl fluoride, vinyl acetate, vinyl propionate, vinyl
pyridine, vinylimidazole, vinyl alcohol, acrylic esters,
methacrylic esters, acrylamide or methacrylamide, with
the dyes obtained according to this invention is prefer-
ably carried out in an acid liquor and at boiling tempera-
ture, if desired with an addition of dispersing agents,
electrolytes, such as sodium sulfate, and the like.

The invention is illustrated by the following examples.
Unless otherwise stated, parts are by weight. Parts by vol-
ume bear the same relation to parts by weight as the liter
(STP) does to the kilogram.

Example 1

33 parts of 1-amino-4-nitroanthraquinone-2-carboxylic chloride, dissolved in 280 parts of xylene, is mixed with 17 parts of γ-cyclohexylmethylaminopropylamine, dissolved in 50 parts of xylene, while stirring and cooling, and the mixture is then stirred for five hours at room temperature and for half an hour at 80° C. The whole is cooled and the product suction filtered, washed in portions with 90 parts of xylene and dried. A product having a melting point of 235° to 236° C. is obtained in a yield of 47 parts.

36 parts of the product thus obtained, mixed with 10 parts of dimethylformamide, is placed in an alloyed steel autoclave provided with stirring means, 120 parts of methylamine is forced in and the mixture is heated to 60° C. and stirred for 2.5 hours at 60° to 65° C. The whole is cooled and decompressed. The reaction mixture is stirred with about 500 parts by volume of water and the dye is suction filtered and washed thoroughly with water. The product is dried; it has a melting point of 140° to 141° C. and the yield is 27 parts.

Example 2

19 parts of γ-cyclohexylmethylaminopropyl amine and then 5 parts of sodium carbonate are introduced at 20° to 30° C. into a solution of 33 parts of 1-amino-4-bromoanthraquinone-2-carboxylic chloride in 250 parts by volume of methanol. The mixture is heated for four hours at 50° to 55° C. and boiled for two hours under reflux. The whole is cooled and the product is suction filtered, washed with methanol and hot water and dried. The yield is 34 parts.

25 parts of the product thus obtained, mixed with 10 parts of dimethylformamide, is placed in a stirred autoclave, 120 parts of methylamine is added and the mixture is heated at 70° to 75° C. for three hours. The product is worked up as described in Example 1 and 21 parts of dye is obtained which is identical with the dye according to Example 1.

Example 3

55 parts of 1-amino-4-nitroanthraquinone-2-carboxylic chloride in 450 parts by volume of xylene is united at room temperature with 33 parts of γ-cyclohexylethylaminopropylamine. The mixture is stirred for ten hours at room temperature and for half an hour at 80° C. The whole is cooled and the product is suction filtered and washed with propanol and water. The yield is 73 parts.

25 parts of the product thus obtained, mixed with 5 parts of dimethylformamide, is heated with 100 parts of methylamine in an autoclave at 55° C. for 2½ hours. The whole is worked up as described in Example 1. 21.5 parts of a dye having a melting point of 126.5° to 128° C. (from ethanol) is obtained.

Example 4

100 parts of polyacrylonitrile flock is dyed for ninety minutes at 100° C. in a liquor containing 2 parts of the dye of Example 1 in dispersed form and 3 parts of formic acid to 2000 parts by volume of water.

The full blue dyeing obtained has very good fastness properties, particularly very good fastness to decatizing.

We claim:
1. A dye of the formula:

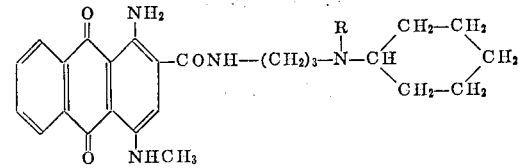

where R represents a member selected from the group consisting of methyl and ethyl.

2. The dye of the formula:

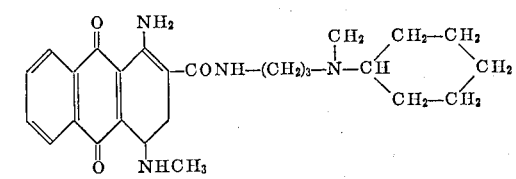

3. The dye of the formula:

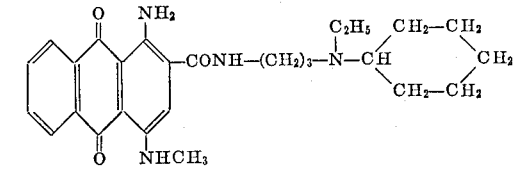

References Cited

UNITED STATES PATENTS 3,076,821   2/1963   Hoare _____ 260—377

LORRAINE A. WEINBERGER, *Primary Examiner.*

H. C. WEGNER, *Assistant Examiner.*

UNITED STATES PATENT OFFICE
CERTIFICATE OF CORRECTION

Patent No. 3,402,185                              September 17, 1968

Karl Maier et al.

It is certified that error appears in the above identified patent and that said Letters Patent are hereby corrected as shown below:

Column 1, formula I, that portion of the formula reading $\overset{|}{N}HCH_2$ should read $\overset{|}{N}HCH_3$ Column 2, formula III, that portion of the formula reading "-COCi" should read -- -COCl --; same column, formula V, that portion of the formula reading $$H_2N-(CH_2)_3-\overset{\overset{R}{|}}{N}-C\Big\langle$$

should read $$H_2N-(CH_2)_3-\overset{\overset{R}{|}}{N}-C\overset{H}{\Big\langle}$$

Column 4, lines 26 to 32, that portion of the formula reading $$-CONH-(CH_2)_3-\overset{\overset{CH_2}{|}}{N}-C\overset{H}{\Big\langle}$$

should read $$-CONH-(CH_2)_3-\overset{\overset{CH_3}{|}}{N}-C\overset{H}{\Big\langle}$$

Signed and sealed this 21st day of April 1970.

(SEAL)
Attest:

EDWARD M. FLETCHER, JR.                      WILLIAM E. SCHUYLER, JR.
Attesting Officer                                    Commissioner of Patents